United States Patent
Asokan et al.

(10) Patent No.: US 9,267,854 B2
(45) Date of Patent: Feb. 23, 2016

(54) STRAIN AND TEMPERATURE DISCRIMINATION USING FIBER BRAGG GRATINGS IN A CROSS-WIRE CONFIGURATION

(75) Inventors: Sundarrajan Asokan, Karnataka (IN); Kalaga Venu Madhav, Kerala (IN); Aashia Rahman, West Bengal (IN); Balaji Srinivasan, Tamil Nadu (IN)

(73) Assignee: Indian Institue of Science (IN)

( * ) Notice: Subject to any disclaimer, the term of this patent is extended or adjusted under 35 U.S.C. 154(b) by 219 days.

(21) Appl. No.: 13/376,542

(22) PCT Filed: Nov. 4, 2010

(86) PCT No.: PCT/IB2010/054997
§ 371 (c)(1),
(2), (4) Date: Dec. 6, 2011

(87) PCT Pub. No.: WO2012/038784
PCT Pub. Date: Mar. 29, 2012

(65) Prior Publication Data
US 2012/0176597 A1    Jul. 12, 2012

(30) Foreign Application Priority Data
Sep. 20, 2010    (IN) .......................... 2744/CHE/2010

(51) Int. Cl.
*G01B 11/16*    (2006.01)
*G02B 6/00*    (2006.01)
(Continued)

(52) U.S. Cl.
CPC ............ *G01K 11/3206* (2013.01); *G01L 1/246* (2013.01); *G02B 6/02204* (2013.01)

(58) Field of Classification Search
CPC . G01L 1/246; G01K 11/3206; G02B 6/02204
USPC ............... 356/32, 305, 328, 334; 250/227.14, 250/227.15, 227.16, 227.18; 385/9, 10, 37
See application file for complete search history.

(56) References Cited

U.S. PATENT DOCUMENTS 5,684,297 A * 11/1997 Tardy ........................ 250/227.14
6,586,722 B1 * 7/2003 Kenny et al. ............. 250/227.16

FOREIGN PATENT DOCUMENTS

FR    WO2008/065140    6/2008

OTHER PUBLICATIONS

James, S. W., M. L. Dockney, and R. P. Tatam. "Simultaneous independent temperature and strain measurement using in-fibre Bragg grating sensors." Electronics Letters 32.12 (1996): 1133-1134.*

(Continued)

*Primary Examiner* — Michael A Lyons
*Assistant Examiner* — Violeta A Prieto
(74) *Attorney, Agent, or Firm* — Moritt Hock & Hamroff LLP; Steven S. Rubin, Esq.

(57) ABSTRACT

A fiber Bragg grating cross-wire sensor may be used to independently determine strain and temperature variation. An example fiber Bragg grating cross-wire sensor comprises a first fiber Bragg grating (FBG) that reflects a first percentage, $R_1$, of light of a first wavelength, $\lambda_1$, and a second FBG that reflects a second percentage, $R_2$, of light of a second wavelength, $\lambda_2$. The second FBG is positioned orthogonal to the first FBG, and $\lambda_1$ is substantially equal to $\lambda_2$, but $R_1$ is different from $R_2$. As the FBG cross-wire sensor experiences a strain and/or a temperature variation, the wavelengths of light reflected by the first FBG and the second FBG will shift from the first and second wavelength, $\lambda_1$ and $\lambda_2$, to first and second shifted wavelengths, $\lambda_A$ and $\lambda_T$, respectively. Based on $R_1$, $R_2$, $\lambda_1$, $\lambda_A$, and $\lambda_T$, the strain and/or the temperature variation may be independently determined.

17 Claims, 8 Drawing Sheets

(51) Int. Cl.
*G01K 11/32* (2006.01)
*G02B 6/02* (2006.01)
*G01L 1/24* (2006.01)

(56) References Cited

OTHER PUBLICATIONS

O. Frazao, L. Ferreira, F. Araujo, J. Santos, ("Applications of Fiber Optic Grating Technology to Multi-Parameter Measurement", Fiber & Integrated Optics, May-Aug. 2005, vol. 24 Issue 3/4, p. 227-244).*
M. Song, S. Lee, S Choi, B. Lee, ("Simultaneous Measurement of Temperature and Strain Using Two Fiber Bragg Gratings Embedded in a Glass Tube", Optical Fiber Technology 3, 194-196 (1997)).*
S. Magne et al., "State-of-strain evaluation with fiber Bragg grating rosettes: application to discrimination between strain and temperature effects in fiber sensors," Applied Optics, vol. 36, No. 36, pp. 9437-9447, 1997.
M. G. Xu et al., "Discrimination between strain and temperature effects using dual-wavelength fibre grating sensors," Electronics Letters, vol. 30, No. 13, pp. 1085-1087, 1994.
S.W. James et al., "Simultaneous independent temperature and strain measurement using in-fibre Bragg grating sensors," Electronics Letters, vol. 32, No. 12, pp. 1133-1134, 1996.
H.J. Patrick et al., "Hybrid fiber Bragg grating/long period fiber grating sensor for strain/temperature discrimination," IEEE Photonics Technology Letters, vol. 8, No. 9, pp. 1223-1225, 1996.
O. Frazao et al., "Simultaneous measurement of strain and temperature using type I and type IIA fibre Bragg gratings," Journal of Optics A: Pure and Applied Optics, vol. 5, pp. 183-185, 2003.
P. Lu et al., "Resolving cross sensitivity of fiber Bragg gratings with different polymeric coatings," Applied Physics Letters, vol. 92, Issue 17, pp. 17112-17112-3, 2008.
G.P. Brady et al., "Simultaneous measurement of strain and temperature using the first- and second-order diffraction wavelengths of Bragg gratings," IEE Proceedings in Optoelectronics, vol. 144, Issue 3, pp. 156-161, 1997.
O. Frazao et al., "Strain-temperature discrimination using a step spectrum profile fibre Bragg grating arrangement," Sensors and Actuators A, vol. 20, pp. 490-490, 2005.
F. M. Haran et al., "A strain-isolated fibre Bragg grating sensor for temperature compensation of fibre Bragg grating strain sensors," Measurement Science and Technology, vol. 9, pp. 1163-1166, 1998.
W. Du et al., "Fiber Bragg Grating Cavity Sensor for Simultaneous Measurement of Strain and Temperature," IEEE Photonics Technology Letters, vol. 11, No. 1, pp. 105-107, 1999.
International Search Report and Written Opinion issued by the Australian Patent Office in PCT/IB2010/054997, dated Jan. 21, 2011.
"Micron Optics," Accessed at http://www.micronoptics.com/uploads/library/documents/FBGsensingSHMcivil.pdf, Accessed on Aug. 20, 2014, pp. 5.
Lima, M. J. N. et al., "Comparison of the temperature dependence of different types of Bragg gratings", Mic. and Opt. Technol. Lett., 2005, pp. 305-307, vol. 45, No. 4.
Song, M. et al., "Interferometric temperature—insensitive strain measurement with use of different-diameter fiber Bragg gratings," Summaries of Papers Presented at the Conference on Lasers and Electro-Optics, 1997, p. 419.
Taunay, T. et al., "Bragg grating inscriptions within strained monomode high NA Germania-doped fibers: part I. Experimentation," J. Phys.D: Appl. Phys., 1997, pp. 40-52, vol. 30.
Tian, K. et al., "Temperature independent fiber Bragg grating strain sensor using bimetal cantilever," optical fiber technology, 2005, pp. 370-377, vol. 11, No. 4.
Tanaka, N., et al., "Temperature-compensated strain measurement using fiber Bragg grating sensors embedded in composite laminates," Smart Material Structure, Nov. 20, 2003, pp. 940-946, vol. 12.

\* cited by examiner

STRAIN AND TEMPERATURE DISCRIMINATION USING FIBER BRAGG GRATINGS IN A CROSS-WIRE CONFIGURATION

CROSS-REFERENCE TO RELATED APPLICATIONS

The present application is the National Stage filing under 35 U.S.C. §371 of International Application No. PCT/IB2010/054997 filed on Nov. 4, 2010. The present application also claims priority to Indian Patent Application Serial No. 2744/CHE/2010, filed on Sep. 20, 2010. The disclosure of both the International Application and the Indian Patent Application are hereby incorporated herein by reference in entirety.

BACKGROUND

Unless otherwise indicated herein, the approaches described in this section are not prior art to the claims in this application and are not admitted to be prior art by inclusion in this section.

Distributed Bragg reflectors are reflectors often used in waveguides, such as optical fibers. In the case of optical fibers, distributed Bragg reflectors are formed by creating a periodic variation (also called modulation) in a refractive index of the waveguide. The periodic variation may be used to reflect a specific wavelength of light as desired by the application.

Often, distributed Bragg reflectors are used in fiber Bragg sensors. Fiber Bragg sensors are used in many applications to detect both strain and temperature variation. Fiber Bragg sensors may be used in place of traditional electrical or mechanical sensors for detecting strain or temperature variation. Among other things, fiber Bragg sensors are smaller and lighter than many conventional sensors, and fiber Bragg sensors have desirable functionality in the presence of electromagnetic radiation or intensity variations. Additionally, a narrow-waveband reflection of fiber Bragg sensors allows multiplexing in a fiber-optic network, for example.

Fiber Bragg sensors are used in many applications, including seismology, structural health monitoring, and down-hole sensing for oil and gas applications, for example, as well as other pressure, temperature, seismic vibration, and inline flow sensor applications.

SUMMARY

In some embodiments, the fiber Bragg grating (FBG) cross-wire sensor may comprise a first FBG configured to reflect a first percentage, $R_1$, of light of a first wavelength, $\lambda_1$. The FBG cross-wire sensor may additionally comprise a second FBG configured to reflect a second percentage, $R_2$, of light of a second wavelength, $\lambda_2$. $\lambda_1$ may be substantially equal to $\lambda_2$, and $R_1$ may be different from $R_2$. The second FBG may be arranged substantially orthogonal to the first FBG.

In some embodiments, the fiber Bragg grating cross-wire sensor may additionally comprise an aluminum base bonded to the first FBG and the second FBG. In some embodiments, the first FBG and the second FBG may be inscribed in a single optical fiber.

In some embodiments, the first FBG may be arranged with the second FBG in a manner to measure one or more of a strain and/or a temperature variation. For example, the first FBG may be configured to shift the wavelength of light reflected by the first FBG from the first wavelength, $\lambda_1$, to a first shifted wavelength, $\lambda_A$, when the first FBG is exposed to strain and/or temperature variation, while the second FBG may be configured to shift the wavelength of light reflected by the second FBG from the second wavelength, $\lambda_2$, to a second shifted wavelength, $\lambda_T$, when the second FBG is exposed to strain and/or temperature variation. In some embodiments, $\lambda_T$ may be different from $\lambda_A$.

The FBG cross-wire sensor may be used to measure one or more of the strain and the temperature variation based on $\lambda_1$ or $\lambda_2$, in combination with $R_1$, $R_2$, $\lambda_A$, and $\lambda_T$. In some embodiments, the first FBG and the second FBG may be configured to have a strain sensitivity, $\epsilon$, a Poisson ratio, $\upsilon$, and a temperature sensitivity, $\tau$, such that one or more of the strain and the temperature variation may be measured based on $\lambda_1$ or $\lambda_2$, in combination with $R_1$, $R_2$, $\lambda_A$, $\lambda_T$, $\epsilon$, $\upsilon$, and $\tau$.

In some embodiments, using the FBG cross-wire sensor to measure one or more of the strain and the temperature may take the form of a method. In some embodiments, the method may comprise providing incident light to the FBG cross-wire sensor to produce a first reflection spectrum comprising a peak at $\lambda_1$. The method may further comprise determining from the first reflection spectrum a value of $\lambda_1$.

The method may further comprise exposing the FBG cross-wire sensor to an environmental condition comprising one or more of a strain and/or a temperature variation so as to configure the first FBG to reflect the first percentage, $R_1$, of light of a first shifted wavelength $\lambda_A$, and the second FBG to reflect the second percentage, $R_2$, of light of a second shifted wavelength $\lambda_T$. The value of $\lambda_A$ may be based on one or more of a temperature variation and/or an axial component of a strain, and the value of $\lambda_T$ may be based on one or more of the temperature variation and/or a transverse component of the strain.

In some embodiments, the method may further comprise providing incident light to the FBG cross-wire sensor to produce a second reflection spectrum comprising a peak of height $R_1$ at $\lambda_A$ and a peak of height $R_2$ at $\lambda_T$ from which values of $R_1$, $R_2$, $\lambda_A$, and $\lambda_T$ may be determined. The method may further comprise measuring one or more of the strain and/or the temperature variation based on the determined values of $R_1$, $R_2$, $\lambda_1$, $\lambda_A$, and $\lambda_T$.

In some embodiments, if $R_1$ is determined to be greater than $R_2$, and $\lambda_A$ is determined, to be greater than $\lambda_T$, the strain may comprise a tensile strain. Similarly, if $R_1$ is greater than $R_2$, and $\lambda_A$ is less than $\lambda_T$, the strain may comprise a compressive strain, in some embodiments, if both $\lambda_A$ and $\lambda_T$ are greater than $\lambda_1$, the temperature variation may be a temperature increase, whereas if both $\lambda_A$ and $\lambda_T$ are less than $\lambda_1$, the temperature variation may be a temperature decrease.

In some embodiments, the FBG cross-wire sensor may be part of an FBG cross-wire system. The system may comprise a broadband light source configured to provide incident light. The FBG cross-wire sensor may comprise a first FBG, configured to receive a first portion of the incident light and reflect a first percentage, $R_1$, of the first portion of the incident light as a first reflected light of a first wavelength, $\lambda_1$. The FBG cross-wire sensor may additionally comprise a second FBG configured to receive a second portion of the incident light and reflect a second percentage, $R_2$, of the second portion of the incident light as a second reflected light of a second wavelength, $\lambda_2$.

The system may further comprise an optical spectrum analyzer configured to receive one or more of the first reflected light and the second reflected light and produce a reflection spectrum. In some embodiments, the reflection spectrum may indicate one or more of a temperature variation and/or an axial component of a strain when the first FBG shifts the first reflected light from the first wavelength, $\lambda_1$, to a first shifted wavelength, $\lambda_A$. Alternately or additionally, the reflection spectrum may indicate one or more of the temperature variation and/or a transverse component of the strain when the second. FBG shifts the second reflected light from the first wavelength, $\lambda_1$, to a second shifted wavelength, $\lambda_T$.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
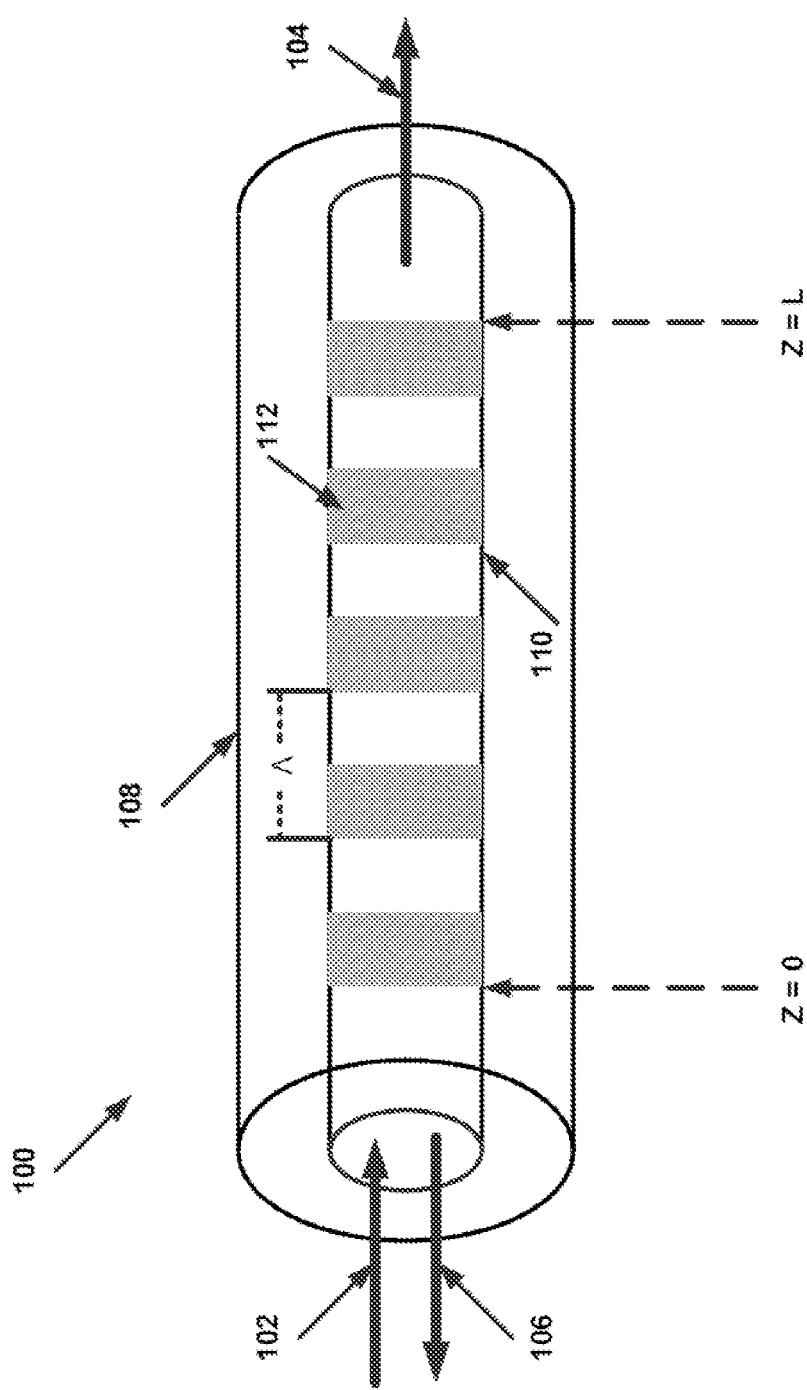
FIG. 1 depicts an example optical fiber into which fiber Bragg gratings have been inscribed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. This disclosure is drawn, inter alia, to methods, devices, and systems related to the sensors. Briefly stated, in some embodiments described herein, a fiber Bragg grating cross-wire sensor may be used to independently determine strain and temperature variation. An example fiber Bragg grating cross-wire sensor may comprise a first fiber Bragg grating (FBG) that reflects a first percentage, $R_1$, of light of a first wavelength, $\lambda_1$, and a second FBG that reflects a second percentage, $R_2$, of light of a second wavelength, $\lambda_2$. The second FBG can be positioned orthogonal to the first FBG, and $\lambda_1$ may be substantially equal to $\lambda_2$, but $R_1$ is different from $R_2$. As the FBG cross-wire sensor experiences a strain and/or a temperature variation, the wavelengths of light reflected by the first FBG and the second FBG will shift from the first and second wavelength, $\lambda_1$ and $\lambda_2$, to first and second shifted wavelengths, $\lambda_A$ and $\lambda_T$, respectively. Based, on values of $R_1$, $R_2$, $\lambda_1$, $\lambda_A$, and $\lambda_T$, the strain and/or the temperature variation may be independently determined.

There are many types of Bragg reflectors, and one in particular is a fiber Bragg grating. FIG. 1 depicts an example optical fiber into which fiber Bragg gratings have been inscribed. Optical fiber 100 is configured to receive incident light 102, a portion of which is transmitted as transmitted light 104, and a portion of which is reflected as reflected light 106. The optical fiber 100 includes a buffer 108 and a core 110, separated by cladding. The optical fiber 100 also includes fiber Bragg gratings 112 that are created by inscribing into the core 110 of the optical fiber 100 a periodic variation in refractive index of the core 110 using, for example, UV light. Other variations include a periodic change in the diameter of the fiber and a periodic change in the refractive index of the cladding. The resulting inscriptions form the gratings 112, which are periodic and have a grating period of $\Lambda$, as shown.

Each fiber Bragg grating 112 is wavelength specific such that each fiber Bragg grating 112 is designed to block a certain wavelength ($\lambda_B$, the Bragg wavelength), for example. Thus, when broadband incident light is provided, to the fiber Bragg grating 112, a percentage of the incident light having the wavelength $\lambda_B$ will be reflected, and a percentage of the incident light having the wavelength $\lambda_B$ will be transmitted. In one example, a large percentage of incident light having the wavelength $\lambda_B$ will be reflected, and a small percentage of incident light having the wavelength $\lambda_B$ will be transmitted. For this reason, a spectrum of reflected light 106 will peak at $\lambda_B$. Thus, the Bragg wavelength, $\lambda_B$, of a particular fiber Bragg grating 112 can be determined through observation of a reflection spectrum produced by the fiber Bragg grating 112, for example.

Effectiveness of the fiber Bragg grating 112 to reflect a desired wavelength is referred to as reflectivity, R, of the grating. A reflectivity of R indicates that the fiber Bragg grating reflects R percent of the incident light of wavelength $\lambda_B$. The Bragg wavelength, $\lambda_B$, can be controlled through design of the fiber Bragg grating 112. In particular, the Bragg wavelength, $\lambda_B$, depends on the grating period $\Lambda$, as well as an effective index of refraction in the grating, n.

The Bragg wavelength is responsive to both strain and changes in temperature. In particular, the Bragg wavelength $\lambda_B$ of a grating shifts to a new wavelength $\lambda_B'$ as a result of a strain S or a change in temperature T. For a given grating, this relationship is given by:

$$\lambda_B' - \lambda_B = \epsilon S + \tau T \qquad \text{Equation (1)}$$

where $\epsilon$ is the strain sensitivity and $\tau$ is the temperature sensitivity of the grating. Thus, due to this relationship, fiber Bragg gratings may be used as sensors. The new wavelength $\lambda_B'$ will be the wavelength at which a reflection spectrum of the fiber Bragg grating will peak when strain and/or temperature variation is present. Determination of $\lambda_B'$ from the reflection spectrum of the fiber Bragg grating allows a determination of the combined influence of applied strain and the temperature change.

As shown above, the Bragg wavelength is simultaneously affected by both strain and temperature. Accordingly, however, measurement of the Bragg wavelength alone does not allow discrimination between the sensor's response to strain and temperature, as shown in Equation (1).

In some embodiments, multiple fiber Bragg gratings, such as within a fiber Bragg grating (FBG) cross-wire sensor, may be used to measure independent contributions of both strain and temperature. The FBG cross-wire sensor can include two or more FBGs inscribed a distance apart in a single optical fiber. At least two of the FBGs have the same Bragg wavelength but differing reflectivities. For use in the sensor, two or more FBGs can be positioned orthogonal to one another in a cross-wire configuration. Additionally, the FBGs can be positioned in close proximity to one another so as to experience the same temperature variation. In this manner, two or more FBGs may be configured to measure the same or substantially same temperature (due to their proximity) but different strains (due to their orthogonal placement).

A reflection spectrum from the FBG cross-wire sensor under the influence of no outside strain or temperature variation can indicate a single resonance peak at the common Bragg wavelength of the two FBGs. A reflection spectrum under the influence of both applied strain and temperature variation can indicate two resonance peaks, one of which corresponds to a shifted Bragg wavelength of the first FBG and the other of which corresponds to a shifted Bragg wavelength of the second FBG. The peaks may be discerned from one another by their differing reflectivities. In particular, the FBG with the higher reflectivity (meaning the FBG reflects a larger percentage of the incident light at its respective shifted Bragg wavelength) will have a peak with a higher reflectivity than the other FBG. Through the known values of the original Bragg wavelength and the two different shifted Bragg wavelengths, the independent contributions of strain and temperature may be determined.

Figure 2:
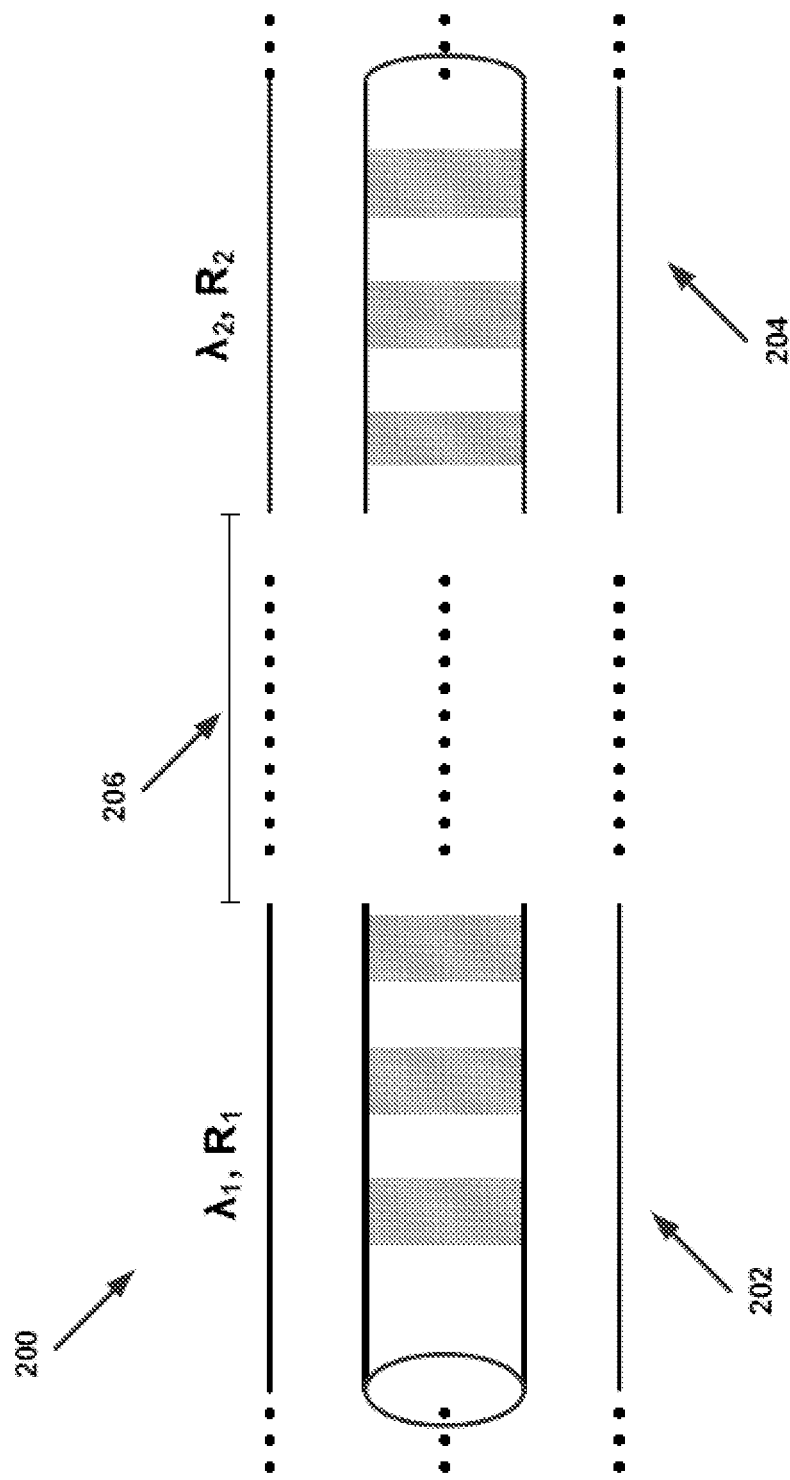
FIG. 2 depicts an example schematic representation of an optical fiber for use in a fiber Bragg grating cross-wire sensor.

FIG. 2 depicts an example schematic representation of an optical fiber for use in a fiber Bragg grating cross-wire sensor, arranged in accordance with at least some embodiments described herein. The optical fiber 200 may be a photosensitive optical fiber, and in particular, the optical fiber 200 may be a germanium-doped silica fiber. Other photosensitive fibers include hydrogen loaded fibers, Boron-doped fibers, and phosphate-doped fibers. Optical fiber 200 is shown comprising a first FBG 202 and a second FBG 204, though the optical fiber 200 may, in some embodiments, comprise additional FBGs. In particular, the FBGs 202 and 204 may be inscribed in the optical fiber 200 using, for example, a phase mask technique and a KrF laser. In one embodiment, the phase mask may have a pitch of about 1075 nm, and the KrF laser may be a 248 nm laser with a repetition rate of about 200 Hz and an energy of about 2.56 mJ. Other phase masks and lasers are possible as well, depending on the doping species. Alternately, an interference technique may be used to form the gratings. Inscription of the FBGs into the optical fiber 200 can include creating a modulated index of refraction in the core, as described above.

As shown in FIG. 2, the first FBG 202 is configured to reflect light of a first wavelength $\lambda_1$ with a first reflectivity $R_1$. In other words, the first FBG 202 reflects a first percentage $R_1$ of light of the first wavelength $\lambda_1$. The subscript 1 is used to denote that the first FBG 202 is oriented along an axial direction.

Similarly, the second FBG 204 is configured to reflect light of a second wavelength $\lambda_2$ with a second reflectivity $R_2$. In other words, the second FBG 204 reflects a second percentage $R_2$ of light of the second wavelength $\lambda_2$. The subscript 2 is used to denote that the first FBG 202 is oriented along a transverse direction. The second FBG 204 is positioned orthogonal to the first FBG 202, as discussed below. In some embodiments, the first FBG 202 and the second FBG 204 may be positioned substantially orthogonal to one another, or may be positioned at another angle. While the first FBG 202 and the second FBG 204 are not parallel to one another, the two FBGs 202 and 204 will experience different strains. However, the difference in strain will be maximized when the second FBG 204 is positioned orthogonal to the first FBG 202.

When no outside strain or temperature variation is present, the Bragg wavelengths of the two FBGs are approximately the same, meaning $\lambda_1$ is approximately equal to $\lambda_2$. However, the reflectivities of the two FBGs are not the same, meaning $R_1$ is different from $R_2$. For example, $R_1$ may be greater than $R_2$. The reflectivity of an FBG may be designed during manufacturing. In particular, the reflectivity of an FBG depends on a grating length, $L_g$, and a grating strength, $\kappa$, of the FBG. The reflectivity is given by the following:

$$\kappa L_g = \tan^{-1}\sqrt{R} \qquad \text{Equation (2)}$$

Thus, the reflectivity can be varied by changing the parameters in Equation (2). In FIG. 2, $L_g$ is the same or approximately the same for the two FBGs 202 and 204. Thus, variation of the reflectivity depends on the grating strength, $\kappa$. The grating strength may be varied by controlling a length of time during which the two FBGs 202 and 204 are exposed to light during fabrication. Longer exposure of the FBGs 202 and 204 results in a higher reflectivity, though at a certain exposure time the reflectivity may saturate. In any case, the first and second FBGs 202 and 204 may be fabricated with the same Bragg wavelength (such that $\lambda_1$ is equal, or substantially equal, to $\lambda_2$), but with different reflectivities (such that $R_1$ is different from $R_2$).

The two FBGs 202 and 204 can be inscribed in two locations in the optical fiber 200 and are separated by a distance 206. The distance 206 may be, for example, about 30 cm. Other distances are possible as well. The distance 206 allows the two FBGs 202 and 204 to be positioned orthogonal to one another, as shown in FIG. 3.

Figure 3:
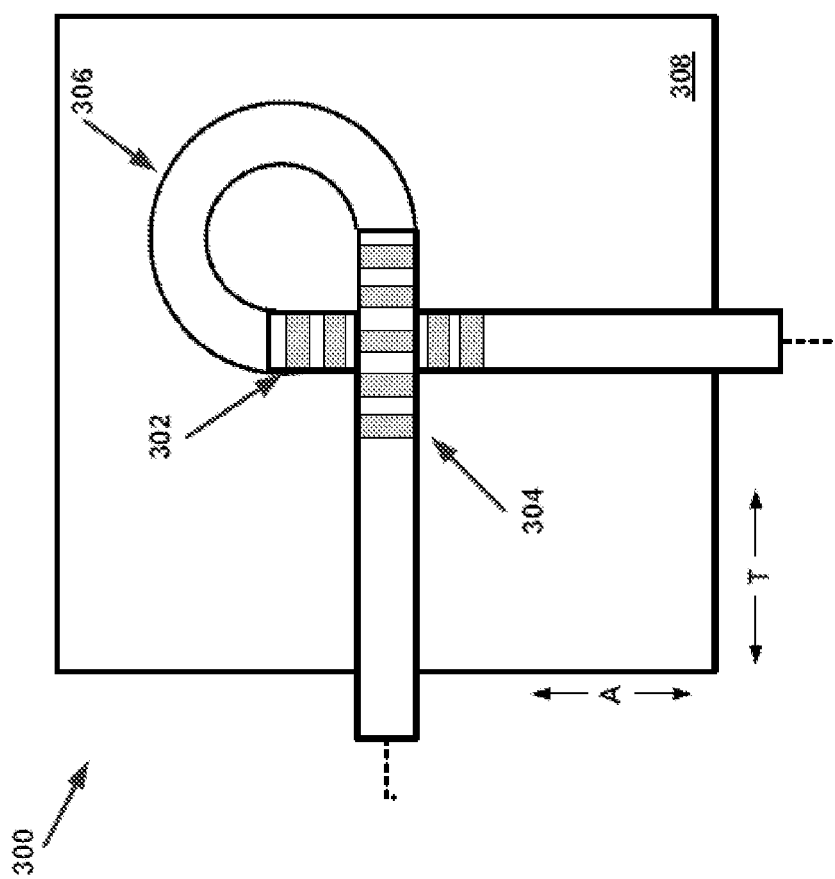
FIG. 3 depicts an example illustration of a fiber Bragg grating cross-wire sensor.

FIG. 3 depicts an example illustration of a fiber Bragg grating cross-wire sensor arranged in accordance with at least some embodiments described herein. FBG cross-wire sensor 300 is shown comprising a first FBG 302 and a second FBG 304 inscribed in a single optical fiber 306. As can be seen from FIG. 3, the two FBGs 302 and 304 are arranged in a cross-wire configuration. In particular, the first FBG 302 is oriented along an axial direction (marked A) and the second FBG 304 is oriented along a transverse direction (marked T), forming a cross. A distance between the first FBG 302 and the second FBG 304 in the optical fiber 306 allows the second FBG 304 to be situated at the same location as or in close proximity to the first FBG 302 while being oriented in a transverse direction. This configuration allows the first FBG 302 and the second FBG 304 to sense the same or substantially the same temperature, but different strains, as described below.

The optical fiber 306 is shown to be arranged in a circular configuration, however, other configurations are possible. The optical fiber 306 may comprise a flexible material allowing for an arrangement into a number of configurations.

In some embodiments, the first FBG 302 may be positioned on top of and orthogonal to the second FBG 304. In other embodiments, the second FBG 304 may be positioned on top of and orthogonal to the first FBG 302. Still further, the first FBG 302 and/or the second FBG 304 may be above or below the other, or configured or arranged in a manner so that a strain and ambient temperature may be sensed by each of the FBGs 302 and 304. In some examples, the second FBG 304 may be positioned directly on top of the first FBG 302, or, in other examples, the second FBG 304 may be arranged at a distance away from the first FBG 302. In any arrangement, the first FBG 302 and the second FBG 304 may be located in the same or substantially same temperature region, such that the first FBG 302 and the second FBG 304 experience the same or substantially same temperature.

To this end, the first FBG 302 and the second FBG 304 may be directly coupled or connected, or alternatively the first FBG 302 and second FBG 304 may be arranged at distances from each other such that they are not connected and even may allow for larger distances to displace them, for example.

The first FBG 302 and the second FBG 304 may be bonded to an aluminum base 308. In some embodiments, the aluminum base 308 may be a square. In some embodiments, the dimensions of the aluminum base may be approximately 1 cm wide×1 cm long×0.23 mm thick. In some embodiments, the base may be made of a material or materials besides aluminum. The base material(s) should have the following properties: the stress hysteresis should be negligible, strain and temperature transfer to the optical fiber material should be good, adherence to the optical fiber material should be good, the total weight of the sensor should be less than that of the base, the material should be pliable, and the Young's Modulus the base material should be close to that of the optical fiber.

Operability of the FBG cross-wire sensor 300 described above is now discussed. As can be seen from FIG. 3, at a location where the first FBG 302 and the second FBG 304 cross, both FBGs 302 and 304 may measure variations in temperature and strain. In particular, the cross-wire configuration allows the two FBGs 302 and 304 to measure the same or substantially same temperature, but different strains. Consider a situation in which an increase in temperature is occurring at the crossing location, and a uniaxial strain is being applied. An axial component of the strain is present along the axial direction (marked A), and a transverse component of the strain is present along the transverse direction (marked T). A relationship between the axial and transverse components of the strain is defined by the Poisson ratio, υ. Thus, the first FBG 302 and the second FBG 304 will react to different strains. However, the first FBG 302 and the second FBG 304 can be utilized to detect the changes (increases or decreases) in temperature to be the same (or about the same).

In the absence of any strain or temperature variation, the wavelengths of light reflected by each of the first FBG 302 and the second FBG 304, also called the Bragg wavelengths, will be substantially the same. This wavelength may by labeled $\lambda_1$. As described above, the wavelength of light reflected by each FBG 302 and 304 may shift to a new wavelength as a result of uniaxial strain S and a variation in temperature T. The wavelength shifts may be measured using, for example, an optical spectrum analyzer.

The Bragg wavelength for the first FBG 302 may shift from $\lambda_1$ to $\lambda_A$. An amount of the shift in Bragg wavelength for the first FBG 302 is given by:

$$\lambda_A - \lambda_1 = \epsilon S + \tau T \qquad \text{Equation (3)}$$

where $\epsilon$ is the strain sensitivity, $\tau$ is the temperature sensitivity of the grating, and $\lambda_A$ is the new or shifted Bragg wavelength of the first FBG 302. The Bragg wavelength $\lambda_A$ is the wavelength at which a first peak on the reflection spectrum of light output from the FBG cross-wire sensor 300 will occur in the presence of strain and temperature variation.

The Bragg wavelength for the second FBG 304 may shift from $\lambda_1$ to $\lambda_T$. An amount of the shift in Bragg wavelength for the second FBG 304 is given by:

$$\lambda_T - \lambda_1 = -\upsilon \epsilon S + \tau T \qquad \text{Equation (4)}$$

where $\upsilon$ is the Poisson ratio and $\lambda_T$ is the new Bragg wavelength of the second FBG 304. The Bragg wavelength $\lambda_T$ is the wavelength at which a second peak on the reflection spectrum of light output from the FBG cross-wire sensor 300 will occur in the presence of strain and temperature variation.

As described above, the Bragg wavelengths of the first FBG 302 and the second FBG 304 are equal (or about equal) in the absence of strain or temperature variation ($\lambda_1$). However, it can be seen from Equations (3)-(4) that in the presence of strain and a change in temperature, the new Bragg wavelengths of the first FBG 302 ($\lambda_A$) and the second FBG 304 ($\lambda_T$) may differ from one another, resulting in two different peaks on the reflection spectrum of the FBG cross-wire sensor 300.

Figure 4:
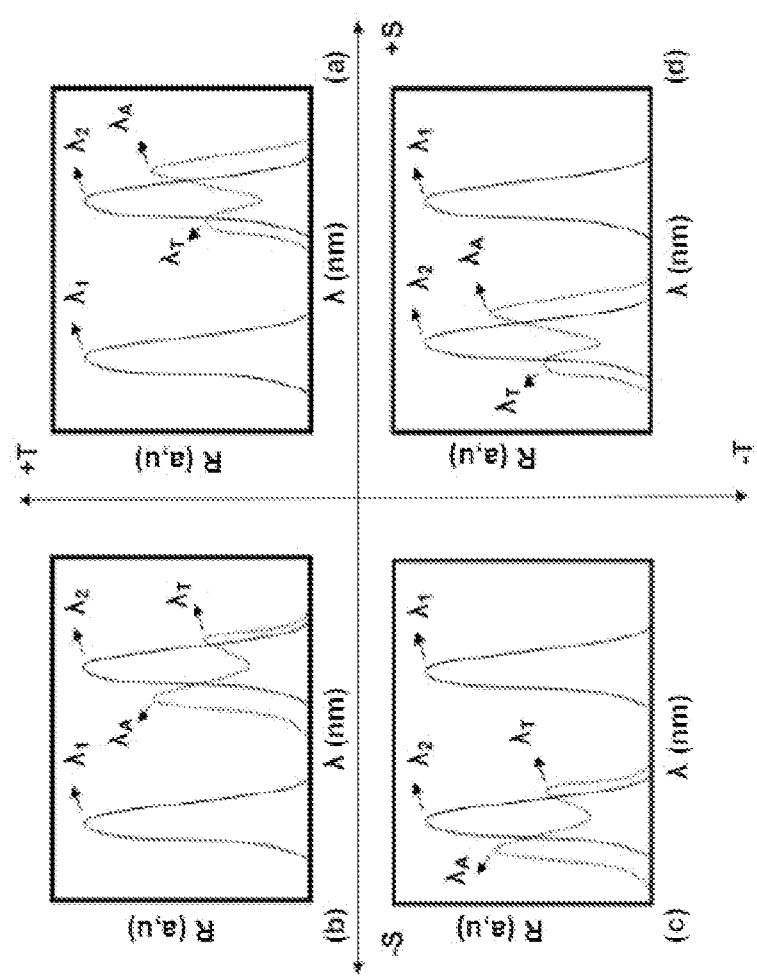
FIG. 4 depicts possible combinations of reflection spectra measured using a fiber Bragg grating cross-wire sensor.

FIG. 4 depicts example reflection spectra measured using a fiber Bragg grating cross-wire sensor, in accordance with at least some embodiments described herein. Possible combinations of the reflection spectra of the FBG cross-wire sensor 300 are shown in FIG. 4. The reflection spectra of FIG. 4 illustrate shifts in the Bragg wavelength under various conditions. In FIG. 4, an original Bragg wavelength of both FBGs 302 and 304 (in the absence of applied strain or temperature variation) is labeled $\lambda_1$. In the event that temperature variation occurs, and no strain is present, the wavelength of light reflected by each of the FBGs 302 and 304 will shift to the same shifted wavelength, labeled $\lambda_2$ (spectra shown using solid lines). This will be the case because each of the two FBGs 302 and 304 will measure the same temperature variation, as described above.

A direction in which the Bragg wavelength shifts indicates whether an increase or a decrease in temperature has occurred. For example, when the temperature increases, the increase in temperature will shift the Bragg wavelength $\lambda_1$ to a new Bragg wavelength $\lambda_2$, and because the temperature has increased, the wavelength $\lambda_2$ will be a longer wavelength than the wavelength $\lambda_1$, as shown in graphs (a) and (b) of FIG. 4. That is, $\lambda_2$ will be shifted to the right of $\lambda_1$ on the spectrum. By contrast, when the temperature decreases, the decrease in temperature will shift the Bragg wavelength $\lambda_1$ to the new Bragg wavelength $\lambda_2$, and because the temperature has decreased, $\lambda_2$ will be shorter than (to the left of) $\lambda_1$, as shown in graphs (c) and (d) of FIG. 4. Thus $\lambda_2$ is an indication of how the Bragg wavelength will shift in the absence of strain.

The graphs in FIG. 4 additionally show values for the Bragg wavelengths of the first FBG 302 ($\lambda_A$) and the second FBG 304 ($\lambda_T$) in the presence of both strain and a change in temperature (spectra shown using dotted lines). As discussed above, in the presence of both strain and temperature variation, the first FBG 302 will measure a different strain than will the second FBG 304. Accordingly, as shown in FIG. 4, in the presence of both strain and temperature variation, the new Bragg wavelengths for each FBG, $\lambda_A$ and $\lambda_T$, will not be equal.

As in the case where temperature variation was present, a direction in which the Bragg wavelength shifts when both strain and temperature variation are present indicates whether an increase or a decrease in temperature has occurred. Additionally, however, in the presence of both strain and temperature variation, relative Bragg wavelengths of the first FBG 302 and the second FBG 304 indicate whether the applied strain is tensile or compressive strain. Consider graph (a). In graph (a), both of the wavelengths $\lambda_A$ and $\lambda_T$ are longer than (that is, to the right of) $\lambda_1$, indicating an increase in temperature. Additionally, however, the wavelength $\lambda_A$ is shorter than (to the left of) the wavelength $\lambda_T$. This comparison of $\lambda_A$ and $\lambda_T$ indicates an applied compressive strain. Graph (c) also shows compressive strain. By contrast, graphs (a) and (d) indicate tensile strain, in which $\lambda_A$ is longer than $\lambda_T$.

As shown in FIG. 4, in the presence of both applied strain and a change in temperature, the original reflection spectrum having a peak at wavelength $\lambda_1$ shifts to the new reflection spectrum having two peaks. One of these peaks is $\lambda_A$ and the other is $\lambda_T$. Yet, as shown above, without knowing whether tensile or compressive strain is being applied, the two peaks of the reflection spectrum may be indistinguishable from one another. This ambiguity is resolved using differing reflectivities of the FBGs.

As mentioned above, the reflectivity of the first FBG 302, $R_1$, is not equal to the reflectivity of the second FBG 304, $R_2$. In the examples shown in FIG. 4, $R_1$ (the reflectivity of the peak located at $\lambda_A$) is greater than $R_2$ (the reflectivity of the peak located at $\lambda_T$). As an example, $R_1$ may be 92%, and $R_2$ may be 80%. $R_1$ could also be less than $R_2$, as long as the reflectivities of the two FBGs 302 and 304 are different, such that each of the different reflectivities may serve as an identifier for each of the FBGs. For example, using the two-peak reflection spectrum of graph (a) and knowing that $R_1$ is greater than $R_2$, a user, computer program, or other entity may determine that the peak with higher reflectivity is $\lambda_A$ due to a larger value of R on the graph (values of R are the y-axis) and $\lambda_A$ belongs to FBG 302. Similarly, using the two-peak reflection spectrum of graph (d), the peak with lower reflectivity is $\lambda_T$. If the first FBG 302 is fabricated to have a higher reflectivity than the second FBG 304, such that $R_1$ is greater than $R_2$, the peak indicating the value $\lambda_A$ will have a higher reflectivity than the peak indicating $\lambda_T$. The peaks are thus distinguishable through the different reflectivities of the FBGs. Accordingly, the reflection spectrum may provide observed values for $\lambda_1$, $\lambda_A$, and $\lambda_T$, for example.

Using observed values, an applied uniaxial strain S and the change in temperature T may be determined using Equations (1) and (2) (reprinted here for convenience). The shift in Bragg wavelength for the first FBG 302 is given by:

$$\lambda_A - \lambda_1 = \epsilon S + \tau T \quad \text{Equation (5)}$$

The shift in Bragg wavelength for the second FBG 304 is given by:

$$\lambda_T - \lambda_1 = -\upsilon \epsilon S + \tau T \quad \text{Equation (6)}$$

Subtracting these two equations, we find that:

$$\lambda_A - \lambda_T = \epsilon S(1+\upsilon) \quad \text{Equation (7)}$$

This equation may be solved for the strain, S:

$$S = \frac{\lambda_A - \lambda_T}{\epsilon(1+\upsilon)} \quad \text{Equation (8)}$$

And equations (8) and (5) may be solved together for the temperature, T:

$$T = \frac{\upsilon \lambda_A - \lambda_T}{\tau(1+\upsilon)} - \frac{\lambda_1}{\tau} \quad \text{Equation (9)}$$

As shown, individual values of strain S and temperature T may be determined from observed or measured values of $\lambda_1$, $\lambda_A$, and $\lambda_T$, each of which may be determined from the reflection spectrum of the FBG cross-wire sensor 300. The FBG cross-wire sensor 300 thus enables discernment between effects of strain and temperature using the two FBGs 302 and 304. Such discernment may be performed by a user, computer program, or other entity, and is possible through the use of two FBGs having the same Bragg wavelength but different reflectivities, for example.

A range of operation of the FBG cross-wire sensor 300 depends on a combined effect of strain and temperature. In one example, conditions for discerning between the strain and the temperature include:

$$\frac{S}{T} < \frac{\tau}{\epsilon \upsilon} \text{ for } ST > 0 \quad \text{Equation (10)}$$

$$\frac{S}{T} < \frac{\tau}{\epsilon} \text{ for } ST < 0 \quad \text{Equation (11)}$$

The conditions in Equations (10)-(11) may ensure that $\lambda_1$ is either greater than, or less than, both $\lambda_A$ and $\lambda_T$, but does not fall between them, for example.

Figure 5:
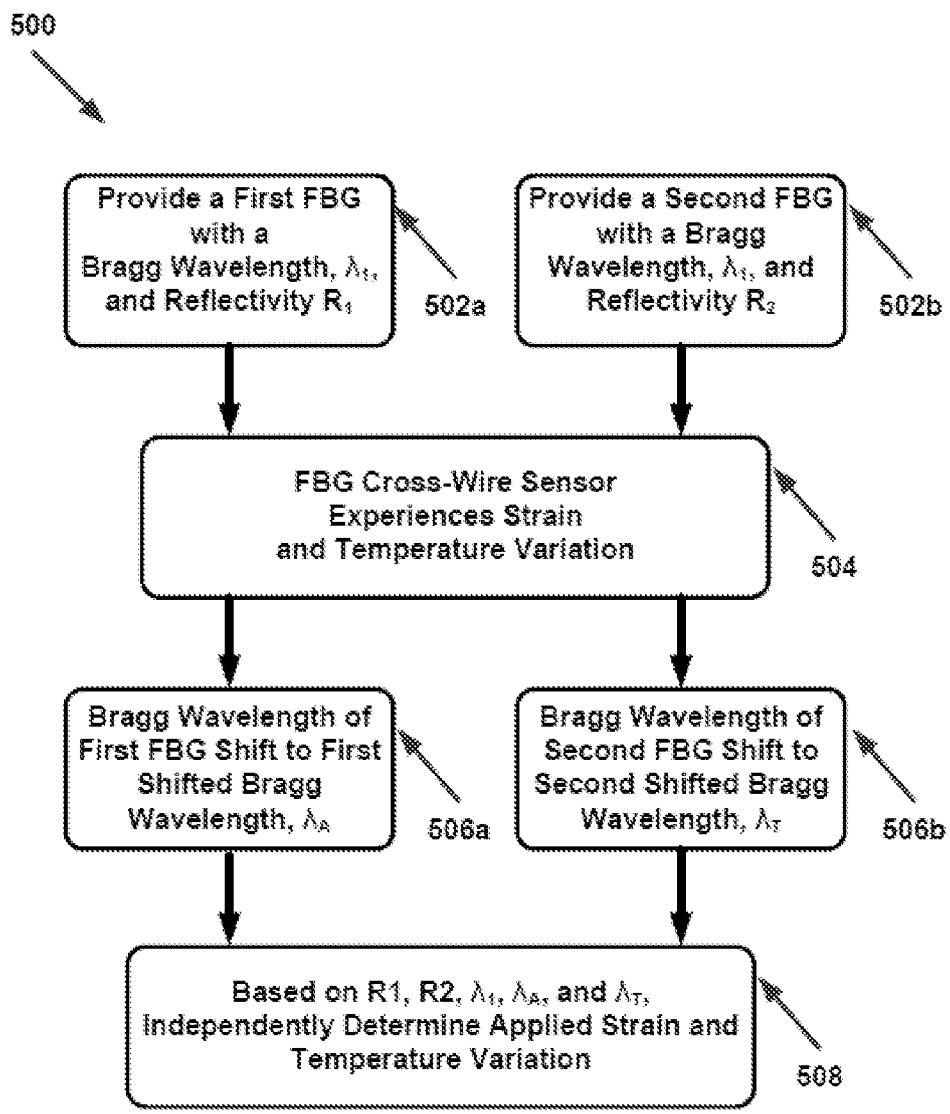
FIG. 5 is a functional block diagram of an example method of independently measuring an applied strain and temperature variation using a fiber Bragg grating cross-wire sensor.

FIG. 5 is a functional block diagram of an example method of independently measuring an applied strain and temperature variation using a fiber Bragg grating cross-wire sensor, arranged in accordance with at least some embodiments described herein. The FBG cross-wire sensor may be, for example, the FBG cross-wire sensor 300 described above and shown in FIG. 3. Method 500 may include one or more operations, functions or actions as illustrated by one or more of blocks 502a, 502b, 504, 506a, 506b, and/or 508. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

The method 500 begins at blocks 502a and 502b by providing a first FBG with a Bragg wavelength of $\lambda_1$ and a reflectivity of $R_1$, and a second FBG with the same Bragg wavelength of $\lambda_1$ and a reflectivity of $R_2$. $R_2$ is different from $R_1$. Blocks 502a and 502b may be followed by block 504.

At block 504, the FBG cross-wire sensor experiences (or is exposed to) a strain and/or a temperature variation. Block 504 may be followed by blocks 506a and/or 506b.

As a result of the experienced strain and/or temperature variation, at blocks 506a and 506b, the Bragg wavelength of the first FBG shifts from the common Bragg wavelength, $\lambda_1$, to a first shifted Bragg wavelength, $\lambda_A$, and the Bragg wavelength of the second FBG shifts front the common Bragg wavelength, $\lambda_1$, to a second shifted Bragg wavelength, $\lambda_T$. Typical shifts may range from 500 pm to 3 nm. Blocks 506a and/or 506b may be followed by block 508.

At block 508, based on the reflectivities, $R_1$ and $R_2$, the common Bragg wavelength, $\lambda_1$, the first shifted Bragg wavelength, $\lambda_A$, and the second shifted Bragg wavelength, $\lambda_T$, the strain and the temperature variation can be independently determined. The determination may also be based on one or more of a strain sensitivity, $\epsilon$, a Poisson ratio, $\upsilon$, and/or a temperature sensitivity, $\tau$, of the FBGs, as described above.

In the event that the reflectivity of the first FBG is greater than the reflectivity of the second FBG, the first shifted Bragg wavelength $\lambda_A$ that is greater than the second shifted Bragg wavelength $\lambda_T$ will indicate that the applied strain is tensile strain. In addition, a first shifted Bragg wavelength $\lambda_A$ that is less than a second shifted Bragg wavelength $\lambda_T$ will indicate that the applied strain is compressive strain. Additionally, when both $\lambda_A$ and $\lambda_T$ are greater than $\lambda_1$, the temperature variation may be determined to be a temperature increase, and when both $\lambda_A$ and $\lambda_T$ are less than $\lambda_1$, the temperature variation is determined to be a temperature decrease, for example.

Figure 6:
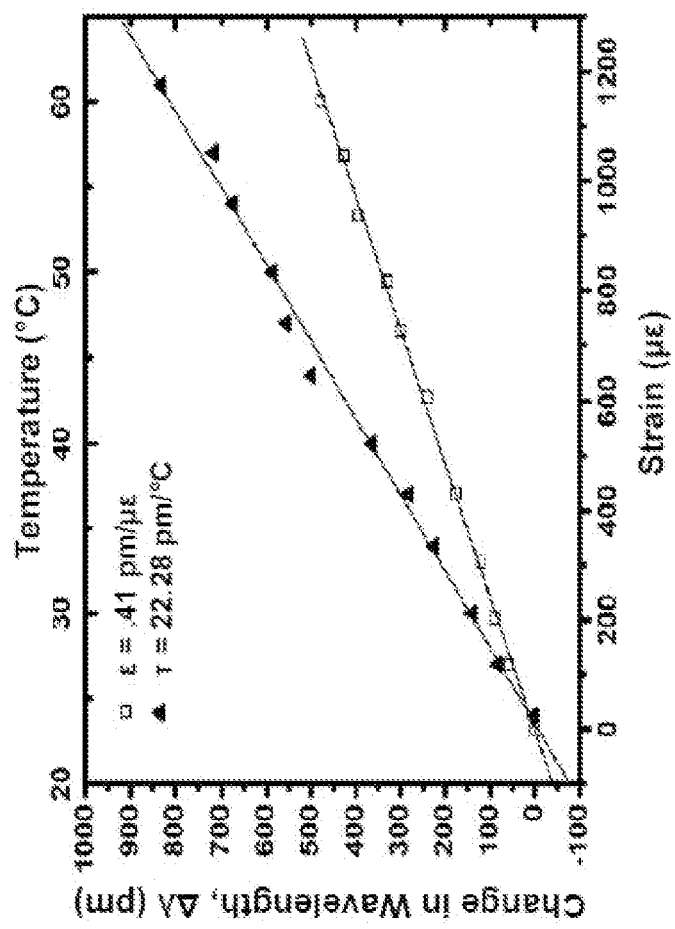
FIG. 6 depicts an example experimental performance of a fiber Bragg grating cross-wire sensor indicating strain sensitivity and temperature sensitivity.

FIG. 6 depicts an example experimental performance of a fiber Bragg grating cross-wire sensor indicating strain sensitivity and temperature sensitivity, in accordance with at least some embodiments described herein. The results are representative of some example FBG cross-wire sensors described herein, such as the FBG 300 shown in FIG. 3. The experimental results indicate strain sensitivity and temperature sensitivity of an FBG cross-wire sensor bonded on an aluminum base. Strain sensitivity, shown along the lower horizontal axis of FIG. 6, indicates a change in wavelength (Δλ) that results from a given amount of strain. Similarly, temperature sensitivity, shown along the upper horizontal access of FIG. 6, indicates a change in wavelength (Δλ) that results from a given amount of temperature variation.

In the experimental setup, the strain sensitivity, $\epsilon$, and the temperature sensitivity, $\tau$, of the FBG cross-wire sensor were measured by applying strain (in the range of 0-1200µε) and temperature (in the range of about 20° C. to about 60° C.) independently. Wavelength shifts of the FBG cross-wire sensor were measured using an optical spectrum analyzer for each case.

To measure the strain sensitivity, the FBG cross-wire sensor was bonded on a cantilever alongside a resistance strain gauge. The squares (□) on the graph in FIG. 6 indicate measured wavelength shift (Δλ) based on the amount of strain. According to FIG. 6, the strain sensitivity, $\epsilon$, can be observed to be about 0.41 pm/µε for a first FBG of the FBG cross-wire sensor. The Poisson's ratio, $\upsilon$, was determined to be about 0.3 for the fabricated FBG cross-wire sensor, and accordingly the strain sensitivity for a second FBG of the FBG cross-wire sensor was found to be about 0.3*(0.41 pm/µε)=0.12 pm/µε. Since a full-width half maximum (FWHM) of the grating was 0.48 pm, the strain resolution of the fabricated FBG cross-wire sensor is about 1µε.

To measure the temperature sensitivity, a K-type thermocouple was used to detect a temperature change alongside the FBG cross-wire sensor. The triangles (▲) on the graph in FIG. 6 indicate measured wavelength shift (Δλ) based on applied temperature variation. According to FIG. 6, the temperature sensitivity, $\tau$, can be observed to be about 22.28 pm/°C. Thus, temperature sensitivities of the first FBG and the second FBG in the experimental setup were found to be the same as one another. In some applications, the temperature range of the FBG cross-wire sensor can be increased (through, for example, use of industrial adhesives like M-bond 600) to about 500° C. (−250° C. to about 250° C.).

The measured strain sensitivity as well as the measured temperature sensitivity may vary slightly from that of the FBG cross-wire sensor itself, as the bonding to the aluminum base can cause an increased stiffness and thermal expansion coefficient.

Figure 7:
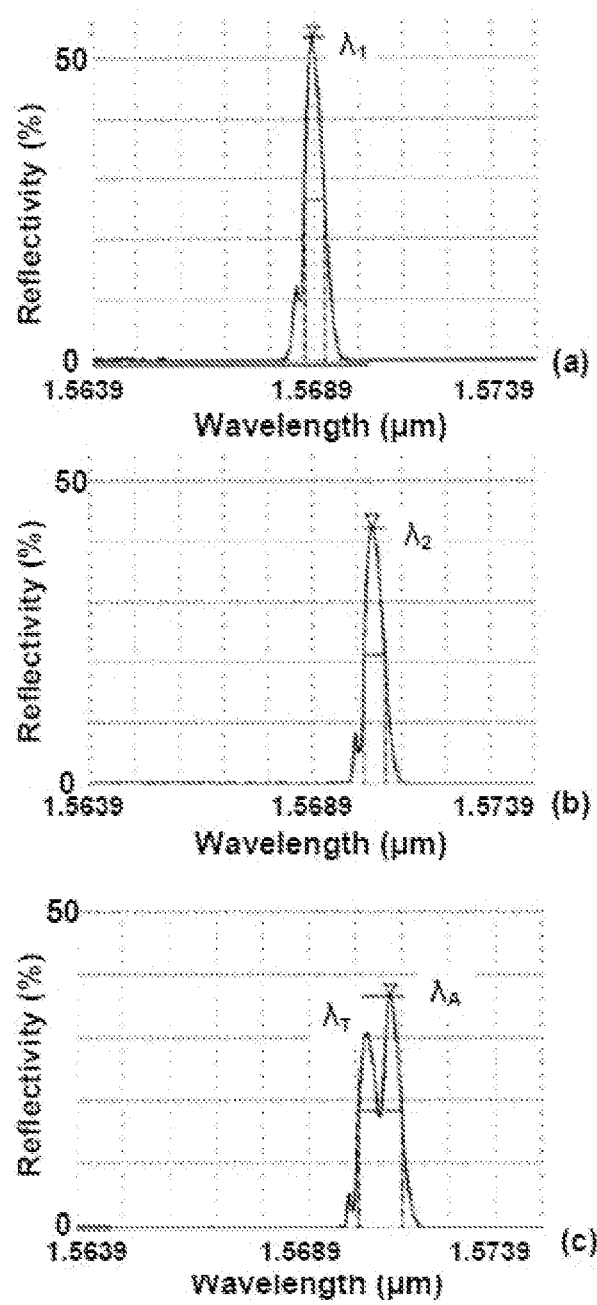
FIG. 7 depicts an example experimental reflection spectra from a fiber Bragg grating cross-wire sensor.

Experiments were also performed to observe a response of the FBG cross-wire sensor to simultaneous strain and temperature variation. FIG. 7 depicts example experimental reflection spectra from a fiber Bragg grating cross-wire sensor, arranged in accordance with at least some embodiments described herein. FIG. 7a shows reflection spectrum of an example FBG cross-wire sensor in the absence of either strain or temperature variation. From FIG. 7a, the original Bragg wavelength, $\lambda_1$, may be observed to be about 1568.78 nm.

FIG. 7b shows reflection spectrum of the FBG cross-wire sensor in the presence of temperature variation but no strain. As described above, both a first FBG and a second FBG of the sensor will measure the same temperature. In the experimental case, the Bragg wavelengths of both FBGs shifts to the value $\lambda_2$, as shown in FIG. 7b. The shifted Bragg wavelength $\lambda_2$ may be observed to be about 1570.14 nm.

FIG. 7c shows the reflection spectrum of the FBG cross-wire sensor in the presence of both applied strain and temperature variation. As described above, the first and second FBGs will measure the same temperature, but different strains cause the shifted Bragg wavelengths to be different. Two peaks can be seen on the reflection spectrum in FIG. 7c. As described above, the two peaks may be identified by their differing reflectivities. In the experimental setup, the first FBG has a higher reflectivity. Accordingly, it may be determined that the peak on the right side shows the shifted Bragg wavelength for the first FBG, $\lambda_A$, observed to be about 1570.56 nm. Further, it may be determined that the peak on the left side shows the shifted Bragg wavelength for the second FBG, $\lambda_T$, observed to be about 1570.02 nm.

Using the measured values of strain sensitivity, $\epsilon$, the Poisson ratio, $\upsilon$, the temperature sensitivity, $\tau$, the original Bragg wavelength, $\lambda_1$, and the shifted Bragg wavelengths, $\lambda_A$ and $\lambda_T$, values for the applied strain and the temperature variation may be independently determined using Equations (8) and (9) above. In this case, the strain was determined to be 1013µε, and the temperature variation was determined to be 61.3° C. Accuracy of the determined values may be assessed through comparison with strain and temperature values measured using a resistance strain gauge and a thermocouple, respectively: 1015µε and 61° C.

Figure 8:
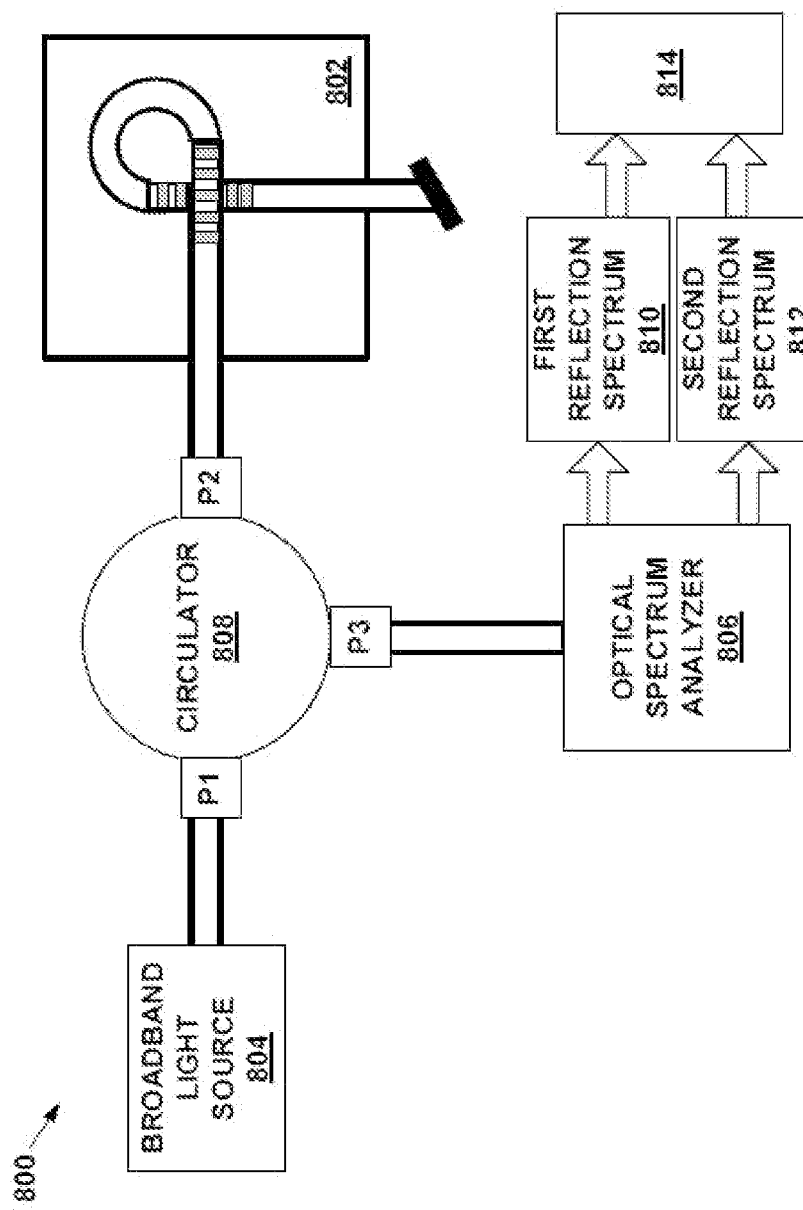
FIG. 8 depicts an example system in which a fiber Bragg grating cross-wire sensor may be used; all arranged in accordance with at least some embodiments of the present disclosure.

FIG. 8 depicts an example system in which a fiber Bragg grating cross-wire sensor may be used, in accordance with at least some embodiments described herein. As shown in FIG. 8, the example system 800 may include an FBG cross-wire sensor 802. The FBG cross-wire sensor 802 may be similar to that described in FIG. 3, for example.

The example system 800 is shown further including a broadband light source 804. The broadband light source 804 is operable to provide incident light to the FBG cross-wire sensor 802. The broadband light source 804 may provide light of a wide range of wavelengths.

The example system 800 is shown farther including an optical spectrum analyzer 806 and a circulator 808. The circulator 808 is connected between the FBG cross-wire sensor 802, the broadband light source 804, and the optical spectrum analyzer 806.

In operation, the broadband light source 804 may launch a broad wavelength spectrum of light that includes the wavelengths reflected by the first FBG and the second FBG. The light is coupled into the FBG cross wire sensor 802 using the circulator 808. Typically the circulator 808 has three ports, shown in FIG. 8 as P1, P2, and P3. Light is coupled between the ports in a single direction, for example, clockwise. In a clockwise embodiment, light entering P1 is coupled into P2, and light entering P2 is coupled into P3. During operation, the light entering P1 from the broadband source 804 is transferred into P2 to serve as incoming light to the FBG cross wire sensor 802.

A first FBG of the FBG cross-wire sensor 802 may be configured to receive a first portion of the incident light from the broadband light source 804 and reflect a first percentage, of the first portion of the incident light as a first reflected light of a first wavelength, $\lambda_1$. Similarly, a second FBG of the FBG cross-wire sensor may be configured to receive a second portion of the incident light and reflect a second percentage, $R_2$, of the second portion of the incident light as a second reflected light of a second wavelength, $\lambda_2$. As described above, $\lambda_1$, may be substantially equal to $\lambda_2$, while $R_1$ may be different from $R_2$.

The difference required between $R_1$ and $R_2$ depends on the equipment used to measure the spectra, as well as the power of the broadband light source 804. In general, a larger difference between the reflectivities may be required in embodiments where the output power of the broadband source is lower, in order to visibly distinguish the peaks. As noted above, example values for $R_1$ and $R_2$ may be 92% and 80%, respectively.

Of the incoming light at P2, a portion will be reflected by the FBG cross wire sensor 802. The reflected light from the FBG cross wire sensor 802 enters P2 and is transferred into P3. Light from P3 is output to the optical spectrum analyzer 806. The optical spectrum analyzer analyzes and separates the light from P3 into the first reflection spectrum 810 and the second reflection spectrum 812.

The first reflection spectrum 810 may comprise a single peak at $\lambda_1$ such that a user, computer program, or other entity 814 may determine the value of $\lambda_1$ from the reflection spectrum 810. When exposed to strain and/or a temperature variation, the reflected wavelengths of light of each of the first FBG and the second FBG may shift to new, shifted wavelengths ($\lambda_A$ and $\lambda_T$) as described above, such that the second reflection spectrum 812 may comprise two peaks at the shifted wavelengths $\lambda_A$ (of height $R_1$) and $\lambda_T$ (of height $R_2$). From the second reflection spectrum 812, a user, computer program, or other entity 814 may determine values of $R_1$, $R_2$, $\lambda_A$, and $\lambda_T$.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be farther understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" "or one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A. B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A sensor comprising:
   a first fiber Bragg grating (FBG) that has a first temperature sensitivity, the first FBG being configured to:
      at a first temperature, reflect a first percentage of an incident light to produce a first reflected light at a first Bragg wavelength;
      at a second temperature, reflect the first percentage of the incident light to produce a second reflected light at a first shifted Bragg wavelength, wherein the first shifted Bragg wavelength is different from the first Bragg wavelength based on the first temperature sensitivity; and
   a second FBG that includes has a second temperature sensitivity, substantially equal to the first temperature sensitivity, the second FBG being arranged not parallel to the first FBG and which crosses with the first FBG, wherein the second FBG is configured to:
  at the first temperature, reflect a second percentage of the incident light to produce a third reflected light at a second Bragg wavelength;
  at the second temperature, reflect the second percentage of the incident light to produce a fourth reflected light at the first shifted Bragg wavelength, the first shifted Bragg wavelength being different from the second Bragg wavelength based on the second temperature sensitivity, wherein the first Bragg wavelength is equal to the second Bragg wavelength, and the first percentage is different from the second percentage;
the second FBG being arranged not parallel to the first FBG and which crosses with the first FBG such that, upon an application of a strain on the sensor:
  the first FBG is further configured to reflect a third percentage of the incident light to produce a fifth reflected light at a second shifted Bragg wavelength based on a first component of the strain;
  the second FBG is further configured to reflect a fourth percentage of the incident light to produce a sixth reflected light at a third shifted Bragg wavelength based on a second component of the strain, the fourth percentage is different from the third percentage, and the third shifted Bragg wavelength is different from the second shifted Bragg wavelength.

2. The sensor of claim 1, further comprising an aluminum base, wherein the first FBG and the second FBG are bonded to the aluminum base.

3. The sensor of claim 1, wherein the first FBG and the second FBG are inscribed in a single optical fiber.

4. The sensor of claim 1, wherein the second FBG crosses with the first FBG such that, the sensor is configured to determine a temperature variation experienced by the sensor.

5. A method to determine a strain and/or a temperature variation experienced by a sensor, the method comprising, by an apparatus:
  providing first incident light, to the sensor, wherein the sensor comprises a first fiber Bragg grating (FBG) and a second FBG, the first FBG has a first temperature sensitivity, the second FBG has a second temperature sensitivity substantially equal to the first temperature sensitivity, the second FBG is arranged not parallel to the first FBG, and the second FBG crosses with the first FBG,
  receiving, from the sensor, a first reflected light at a first Bragg wavelength, wherein the first reflected light being produced by a reflection of a first percentage of the first incident light by the first FBG at a first temperature;
  receiving, from the sensor, a second reflected light at a second Bragg wavelength, the second reflected light being produced by a reflection of a second percentage of the first incident light by the second FBG at the first temperature, the second Bragg wavelength is equal to the first Bragg wavelength, and the second percentage is different from the first percentage;
  determining the first and second percentages based on the first and second reflected light;
  exposing the sensor to an environmental condition, wherein the environmental condition comprises a strain and/or a temperature variation, the strain including a first component and a second component, and the temperature variation is effective to indicate a difference between the first temperature and a second temperature;
  providing second incident light to the sensor;
  receiving, from the sensor, a third reflected light at a first shifted Bragg wavelength, the third reflected light being produced by a reflection of a third percentage of the second incident light by the first FBG in response to the exposure of the sensor to the environmental condition, and the first shifted Bragg wavelength is different from the first Bragg wavelength based on the first component of the strain and based on the first temperature sensitivity;
  receiving, from the sensor, a fourth reflected light at a second shifted Bragg wavelength, the fourth reflected light being produced by a reflection of a fourth percentage of the second incident light by the second FBG in response to the exposure of the sensor to the environmental condition, the fourth percentage is different from the third percentage, and the second shifted Bragg wavelength is different from the second Bragg wavelength based on the second component of the strain and based on the second temperature sensitivity;
  determining the first shifted Bragg wavelength and the second shifted Bragg wavelength based on the third and fourth reflected light; and
  determining the strain and/or the temperature variation based on the first percentage, the second percentage, the first shifted Bragg wavelength, and the second shifted Bragg wavelength.

6. The method of claim 5, wherein when the first percentage is greater than the second percentage, and the first shifted Bragg wavelength is greater than the second shifted Bragg wavelength, determining the strain comprises determining a tensile strain.

7. The method of claim 5, wherein when the first percentage is greater than the second percentage, and the first shifted Bragg wavelength is less than the second shifted Bragg wavelength, determining the strain comprises determining a compressive strain.

8. The method of claim 5, wherein determining the strain and/or the temperature variation is further based on one or more of a strain sensitivity, and a Poisson ratio, of the first FBG and the second FBG.

9. The method of claim 5, wherein when both the first shifted Bragg wavelength and the second shifted Bragg wavelength are greater than the first Bragg wavelength, determining the temperature variation comprises determining a temperature increase.

10. The method of claim 5, wherein when both the first shifted Bragg wavelength and the second shifted Bragg wavelength are less than the first Bragg wavelength, determining the temperature variation comprises determining a temperature decrease.

11. A system comprising:
  a broadband light source configured to provide incident light;
  a sensor comprising:
    a first fiber Bragg grating (FBG) that has a first temperature sensitivity;
    a second FBG that has a second temperature sensitivity substantially equal to the first temperature sensitivity, the second FBG arranged not parallel to the first FBG, the second FBG crosses with the first FBG;
  the sensor being configured to receive the incident light from the broadband light source;
  the first FBG being configured to:
    at a first temperature, reflect a first percentage of the incident light to produce a first reflected light at a first Bragg wavelength;

at a second temperature, reflect the first percentage of the incident light to produce a second reflected light at a first shifted Bragg wavelength, wherein the first shifted Bragg wavelength is different from the first Bragg wavelength based on the first temperature sensitivity; and the second FBG being configured to:
  at the first temperature, reflect a second percentage of the incident light to produce a third reflected light at a second Bragg wavelength;
  at the second temperature, reflect the second percentage of the incident light to produce a fourth reflected light at the first shifted Bragg wavelength, the first shifted Bragg wavelength being different from the second Bragg wavelength based on the second temperature sensitivity, wherein the first Bragg wavelength is equal to the second Bragg wavelength, and the first percentage is different from the second percentage;

the second FBG being arranged not parallel to the first FBG such that, upon an application of a strain on the sensor:
  the first FBG is further configured to reflect a third percentage of the incident light to produce a fifth reflected light at a second shifted Bragg wavelength based on a first component of the strain;
  the second FBG is further configured to reflect a fourth percentage of light as a sixth reflected light at a third shifted Bragg wavelength based on a second component of the strain, and the fourth percentage is different from the third percentage;

an analyzer configured to:
  receive the first reflected light, the third reflected light, the fifth reflected light, and the sixth reflected light from the sensor;
  determine the first percentage, and the second percentage based on the first and third reflected light;
  determine the second shifted Bragg wavelength, and the third shifted Bragg wavelength based on the fifth and sixth reflected light; and
  determine the strain and/or a temperature variation based on the first percentage, the second percentage, the second shifted Bragg wavelength, and the third shifted Bragg wavelength.

12. The system of claim 11, wherein the second shifted Bragg wavelength is not equal to the third shifted Bragg wavelength.

13. The system of claim 11, wherein the first FBG and the second FBG are inscribed in a single optical fiber.

14. The system of claim 11, wherein the sensor further comprises an aluminum base bonded to the first FBG and the second FBG.

15. The system of claim 11, wherein the determination of the strain and/or the temperature variation is further based on the first Bragg wavelength and the second Bragg wavelength, in combination with the first percentage, the second percentage, the second shifted Bragg wavelength, and the third shifted Bragg wavelength.

16. The system of claim 11, wherein the first FBG and the second FBG are configured to have a strain sensitivity, and a Poisson ratio, such that measurements of the strain and the temperature variation is further based on the first Bragg wavelength and the second Bragg wavelength, in combination with the first percentage, the second percentage, the second shifted Bragg wavelength, the third shifted Bragg wavelength, the strain sensitivity, the Poisson ratio, and the temperature sensitivity.

17. The sensor of claim 1, wherein the second FBG is arranged orthogonal to the first FBG.

* * * * *

UNITED STATES PATENT AND TRADEMARK OFFICE
CERTIFICATE OF CORRECTION

| | | |
|---|---|---|
| PATENT NO. | : 9,267,854 B2 | |
| APPLICATION NO. | : 13/376542 | |
| DATED | : February 23, 2016 | |
| INVENTOR(S) | : Asokan et al. | |

It is certified that error appears in the above-identified patent and that said Letters Patent is hereby corrected as shown below:

Specification

In Column 1, Line 10, delete "§371" and insert -- § 371 --, therefor.

In Column 2, Line 43, delete "determined," and insert -- determined --, therefor.

In Column 2, Line 46, delete "strain, in" and insert -- strain. In --, therefor.

In Column 3, Line 5, delete "second. FBG" and insert -- second FBG --, therefor.

In Column 4, Line 1, delete "Based," and insert -- Based --, therefor.

In Column 4, Line 23, delete "provided," and insert -- provided --, therefor.

In Column 4, Line 38, delete "incident light" and insert -- incident light 102 --, therefor.

In Column 7, Lines 17-18, delete "Modulus the" and insert -- Modulus of the --, therefor.

In Column 10, Line 37, delete "front" and insert -- from --, therefor.

In Column 12, Line 47, delete "percentage," and insert -- percentage, $R_1$, --, therefor.

In Column 13, Line 46, delete "farther" and insert -- further --, therefor.

Claims

In Column 14, Lines 65-66, in Claim 1, delete "that includes has a second temperature sensitivity," and insert -- that has a second temperature sensitivity --, therefor.

In Column 15, Line 40, in Claim 5, delete "light," and insert -- light --, therefor.

Signed and Sealed this
Nineteenth Day of July, 2016

Michelle K. Lee
*Director of the United States Patent and Trademark Office*